April 21, 1931.  E. G. PETERSEN  1,801,977
TIRE LOCK
Filed Feb. 2, 1929   2 Sheets-Sheet 1

Inventor
Edgar G. Petersen
By Williams Bradbury McCaleb & Hinkle
Attys.

April 21, 1931.                E. G. PETERSEN                1,801,977
                                  TIRE LOCK
                    Filed Feb. 2, 1929        2 Sheets-Sheet 2
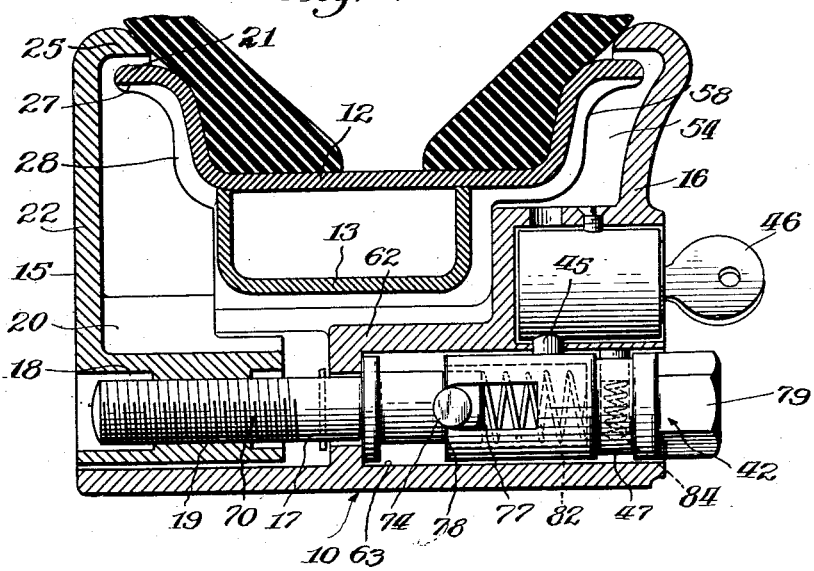
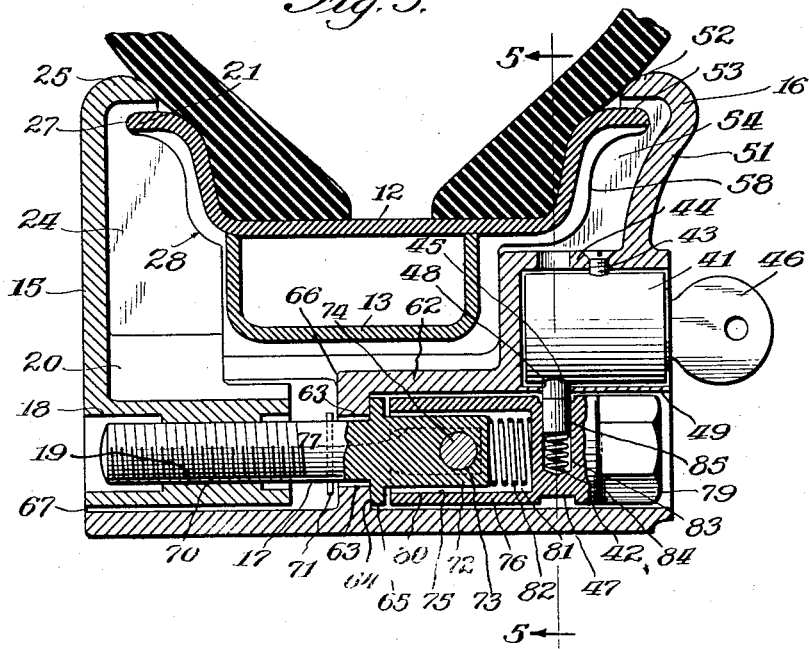
Inventor
Edgar G. Petersen
By Williams Bradbury McCaleb & Hinkle
Attys.

Patented Apr. 21, 1931

1,801,977

UNITED STATES PATENT OFFICE

EDGAR G. PETERSEN, OF CHICAGO, ILLINOIS, ASSIGNOR TO PINES WINTERFRONT COMPANY, OF CHICAGO, ILLINOIS, A CORPORATION OF DELAWARE

TIRE LOCK

Application filed February 2, 1929. Serial No. 337,121.

The present invention relates to spare tire locks, and is particularly concerned with locks for preventing the unauthorized removal of automobile tires or rims from carriers.

One of the objects of the invention is the provision of an improved spare tire lock which is adapted to lock a tire rim more securely, to prevent unauthorized removal of the rim from a carrier.

Another object is the provision of an improved lock having means for positively clamping a rim on a carrier to prevent removal or rattling, and means for indicating the locked or unlocked condition of the lock.

Another object is the provision of a lock of the class described, including a clamping device for securing a spare part and an actuating device which may be projected to permit actuation of said clamping device, or which may be retracted to prevent access to said actuating device when the lock is in locked condition.

Another object is the provision of a lock of the class described, including a key actuated member so arranged that no breaking strain can be brought to bear upon the key actuated member which may be of relatively light and economical construction.

Another object is the provision of a lock of the class described, having a plurality of parts, all of which are secured together in the unlocked condition of the lock, so that the possibility of the loss of parts is eliminated.

Other objects and advantages of the invention will be apparent from the following description, and from the accompanying drawings, in which similar characters of reference indicate similar parts throughout the several views.

Referring to the drawings, of which there are two sheets;

Fig. 2 is a sectional view taken on the line 2—2 of Fig. 1, looking in the direction of the arrows, with the device in clamping position, but unlocked;

Fig. 3 is a similar view with the device in locked position;

Figure 1:
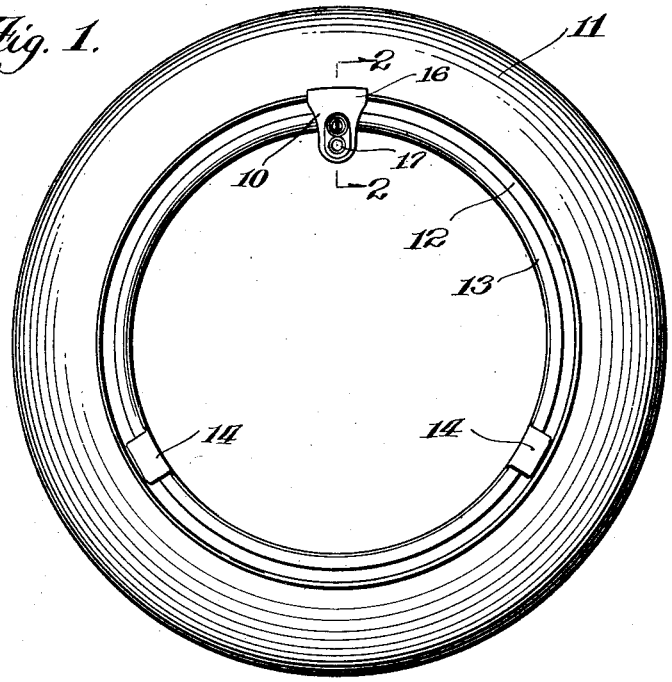
Fig. 1 is an elevational view of my locking device applied to a spare rim tire and carrier.
Figure 4:
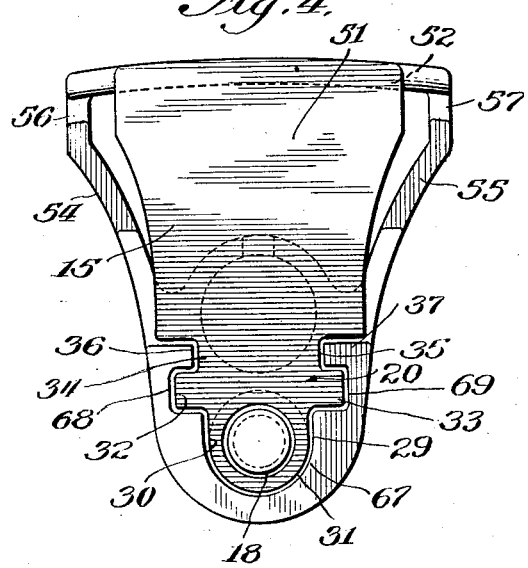
Fig. 4 is a rear elevational view of the lock removed from the rim.

Referring to Figs. 1 to 3, the lock indicated in its entirety at 10 is illustrated in connection with the conventional tire 11, a rim 12 and a tire carrier 13. The tire carrier in the assembly illustrated, comprises an annular metal member which is permanently secured to some part of a vehicle, such as an automobile, and the rim is provided with a plurality of lugs or flanges 14 projecting radially from the carrier at its front and back at a plurality of points opposite to the location of the lock 10, in such manner that the rim 12 may be placed on the carrier 13 with its lower portion between the lugs 14, after which the rim is pivoted over into the plane of the carrier 13 and secured with the lock 10.

In the embodiment illustrated, the lock 10 which is adapted to be applied to any standard tire carrier and rim, includes a pair of separate clamping members 15 and 16, both removable from the rim and carrier, and secured together by a threaded member 17. It should be understood, however, that the clamping member 15 may be an integral part of the carrier 13 or permanently secured to the carrier if desired, so that the removable portion of the lock may consist of the clamping member 16 with its associated parts. The clamping member 15 may comprise a cast metal member preferably formed of steel, having a bore 18 with a threaded portion 19 adapted to receive the threaded member 17 and having a laterally projecting portion 20 adapted to embrace the carrier 13, and to extend past the edge 21 of the rim 12.

In order to increase the strength of the lock, without unduly increasing the weight of the same, the clamping member 15 may be provided with a rear wall 22 and a pair of side flanges 23 and 24 at substantially right angles to the wall 22, and extending from the body portion 15 adjacent bore 19 to a transverse flange 25 carried by the extreme edge of the clamping member. The flanges 23 and 24 are notched as at 26 and 27 to receive the edge 21 of the rim 12, and the intermediate portions of the flanges 23 and 24 may be cut away as at 28 to conform to the rim and carrier, with sufficient clearance so that the rim is actually clamped in the notches 26 and 27.

The upper transverse flange 25 constitutes a shoulder engaging above the edge 21 of rim 12 for retaining the clamping member on the rim, while the flanges 23 and 24 at the base of the notches 26 and 27 constitute the clamping shoulder for laterally engaging the edge of the rim 21.

The body portion 20 of clamping member 15 may be formed with guides extending substantially parallel to the threaded bore 19 for the purpose of preventing rotative motion between the clamping members 15 and 16, and the guides may comprise a socket 29 formed in clamping member 16 and a complementary exterior surface 30 formed on the clamping member 15.

In the present embodiment, the guide not only slidably supports the clamping members 15 and 16 relative to each other, but it prevents lateral movement between these members and for this purpose, the body portion 20 may be substantially cylindrical at 31 about the bore 18, having laterally projecting ribs 32 and 33 formed on the body portion 20 above the bore 18, and substantially parallel thereto. Above the ribs 32 and 33 the body portion 20 may be formed with longitudinally extending slots 34 and 35 also extending substantially parallel to the bore 18 and adapted to receive the complementary longitudinally extending ribs 36 and 37 formed in the socket 29 of the clamping member 16.

The ribs 32, 33, 36 and 37 are preferably of substantial thickness and substantially rectangular in cross section with rounded corners having a substantial tolerance relative to the slots in which they are received so that these members may be formed of cast metal, and at the same time slide freely in their slots, providing guides which are of great strength and which it is practically impossible to demolish by external force applied with ordinary tools.

The lateral flanges 23 and 24 also enclose and protect the internal mechanism of the locking device and prevent the insertion of prying or breaking tools between the clamping member 15 and the rim 12 or carrier 13.

The clamping member 16 comprises a cast metal member preferably formed of steel, having a body portion 38 formed with a pair of sockets 39 and 40 adapted to receive a key actuated tumbler barrel 41 and an actuating member 42 for the threaded member 17. The sockets 39 and 40 may comprise substantially cylindrical bores and the key actuated tumbler barrel 41 may be secured in its socket 39 by a set screw 43 extending from the inside of the lock through an upper wall 44 and engaging the tumbler barrel 41.

The tumbler barrel 41 may be of the conventional type having a laterally projecting locking bolt 45 adapted to be withdrawn or extended from the tumbler barrel by turning a key 46 and the tumbler barrel is preferably of the type from which the key 46 cannot be removed unless the tumbler barrel parts are in locked position. If desired, the tumbler barrel 41 may have a spring pressed plunger 45 adapted to be projected into the annular slot 47 of the actuating member 42 when the slot 47 is in registration with the locking bolt 45 and the key 46 is in proper position.

In order to provide communication between the sockets 39 and 40, a bore 48 may be formed in the wall 49 between said sockets by drilling a hole from the top or inside of the clamping member 16 through the upper wall 44 of socket 39, incidentally forming the bore 50.

Above the sockets 39 and 40, the body portion 38 of clamping member 16 is provided with an upwardly extending wall 51 terminating in a laterally projecting flange 52 which is adapted to engage over the other edge 53 of rim 12, and the lateral edges of the wall 51 are provided with inwardly projecting flanges 54 and 55, somewhat similar to the flanges 23 and 24 and likewise formed with slots 56 and 57 adapted to receive the edge 53 of rim 12.

The intermediate edge portion of flanges 54 and 55 may be shaped as at 58, substantially complementary to the adjacent surface of the rim 12 and carrier 13, with sufficient tolerance to permit the rim 12 to be clamped at its outer edge 53 by the base of the slots 56 and 57. The flange 52 constitutes a shoulder for engaging above the edge 53 of rim 12 for retaining the lock upon the rim, and the bases of the slots 56 and 57 constitute shoulders for clamping engagement with the outer surface of the edge 53.

The flanges 25 and 52 are preferably curved to conform substantially to the curvature of the smallest rim with which they are intended to be used, but the locks may also be used upon rims having larger curvature, in which event the points of engagement of the flanges 25 and 52 will be the extreme outer portions 59 and 60 of the lower surface 61 or flange 25, or corresponding surfaces on the flange 52.

The body portion 38 is of sufficient thickness at the socket 39 to house the tumbler barrel 41, and it is found that the width of the ordinary rim 12 relative to carrier 13 is sufficient to permit clamping of the rim without both of the clamping members engaging the carrier. The lateral flanges 23, 24, 54, 55 also provide a means of clamping the rim 12 without interfering with the carrier 13, since the depth of the flanges may be increased whenever necessary in constructing a locking device for a carrier of greater width, thereby leaving sufficient body portion to house the tumbler barrel 41.

The body portion 38 surrounding the bore 40 is extended backward as at 62 beneath the carrier 13 forming an elongated socket for receiving the threaded member 17 and actuating member 42. The bore 40 communicates with a counterbore 63 forming a shoulder 64 for engaging a laterally projecting shoulder or annular flange 65 carried by threaded member 17 for permanently retaining the threaded member 17 in socket 40.

The body member 38 is hollowed out beyond the counterbore 63 forming a socket 29 which is open at its upper side 66 and its rear side 67 to slidably receive and guide the clamping member 15.

The socket 29 is substantially complementary in form to the adjacent surface of the clamping member 15 having a lower cylindrical portion 67 adapted to slidably receive the cylindrical portion 30 of clamping member 15 and having longitudinally extending slots 68 and 69 above said cylindrical portion and extending substantially parallel to the axis of the cylindrical portion 67 for receiving the guide ribs 32 and 33 carried by clamping member 15.

Above the slots 68 and 69 the body member 38 is formed with inwardly projecting, longitudinally extending ribs 36 and 37 also substantially parallel to the axis of cylindrical portion 67 and adapted to be received in slots 34 and 35 formed in the clamping member 15. The longitudinally extending ribs and slots formed on both the clamping members, constitute shoulders for preventing rotative movement between the clamping members, for slidably guiding these members relative to each other and for preventing removal of one member from another when the lock is removed from the carrier.

The threaded member 17 in the present embodiment, comprises a bolt having a threaded portion 70 adapted to be received in the threaded bore 19, but I desire it to be understood that any form of threaded member may be used and in some embodiments of my invention, the clamping member or support may be provided with an externally threaded part adapted to be received in an internally threaded bore carried by threaded member 17. The threaded member is retained in the socket 40 by the integral annular flange 65 and by a transverse pin 71 driven into frictional engagement with a bore in the threaded member 17 just beyond counterbore 63.

Within the socket 40 beyond the annular flange 65, the threaded member 17 is provided with a cylindrical portion 72 having a bore 73 adapted to receive a transverse pin 74 driven into frictional engagement with bore 73. The annular space 75 surrounding cylindrical portion 72 is adapted to receive the sleeve-like portion 76 of actuating member 42 and the sleeve 76 is provided with longitudinally extending slots 77 adapted to embrace ends of the pin 74.

The ends of the slots 77 may be slightly riveted or peened over at 78 to form shoulders adapted to prevent the removal of the pin 74 from slot 77, thereby permanently retaining the actuating member 42 slidably upon the threaded member 17. The actuating member 42 comprises a substantially cylindrical metal member adapted to be rotatably received in the bore 40 and formed with a non-circular end 79 for engagement with a wrench or other tool. In the present embodiment, the end 79 is hexagonal, but it will be understood that any conventional non-circular end may be employed, and when the parts are in the position of Fig. 2, the end 79 may be employed for engagement with a wrench to thread the threaded member 17 into its bore 19 or for producing a reverse motion of the same.

The opposite end of the actuating member 42 is provided with an axially extending bore 80 of sufficient depth to receive the cylindrical head 72 of threaded member 17 and to leave a space 81 adapted to receive a helical spring 82 tensioned between the end of threaded member 17 and the bottom of bore 80. The actuating member 42 is also provided with an annular groove 47 adapted to register with the locking bolt 45 and to receive the same when the actuating member 42 is in the retracted position shown in Fig. 3 with its non-circular end 39 in the socket 40 to prevent access to said end.

The spring 82 is adapted to tension the actuating member 42 against the locking bolt 45 to prevent any rattling of the actuating member, and the spring is also adapted to forcibly project the actuating member 42 to bring the parts into the position of Fig. 2, both indicating that the lock is in unlocked condition and bringing the actuated member into a position where it can be acted upon by a wrench.

As an additional precaution against the removal of the lock by producing some slight rotative movement of the actuating member 42 by means of various tools, I prefer to provide the actuating member 42 with a socket or bore 83 adapted to receive a helical spring 84 and a spring pressed cylindrical plunger 85. The plunger is preferably located in the annular slot 47 so that it is adapted to engage the locking bolt 45 when the plunger 85 registers with bore 48 as shown in Fig. 3. When the plunger 85 does not register with the locking bolt 45 in its final position with the clamping members upon the rim, the plunger 85 will merely engage the side of bore 40 so that it will not constitute an impediment to the projection of the actuating member 42 by spring 82 when locking bolt 45 is withdrawn. However, when the rotative position of the actuating member 42 in the locked condition is as shown in Fig. 5, the plunger 85 is adapted to engage the side of the locking bolt 45 to positively prevent any rotative movement of the actuating member 42 so that even though tools might be inserted in the bore 40 at the flat portions of the non-circular end 79, sufficient purchase could not be secured on the actuating member to turn it in its socket, because such motion will be positively prevented by the plunger 85 engaging locking bolt 45.

The assembly of my locking device will be obvious, although it might be noted that the actuating member 42 is assembled with the threaded member 17 and the ends of slots 77 are peened over at 78 to permanently fasten these two members together before they are placed in the clamping member 51 and secured by pin 71.

The operation of my locking device is as follows.

Figure 5:
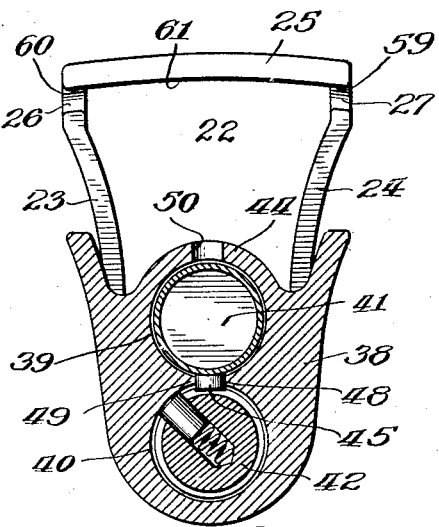
Fig. 5 is a sectional view taken on the line 5—5 of Fig. 3, with the lock removed from the rim and with the parts in a slightly different but locked position.

When the parts are in the position shown in Figs. 3 or 5, the device is locked on the rim, embracing the carrier 13 and the clamping members 22 are in clamping engagement with the edges 21 and 53 of the rim, firmly securing the locking device on the rim without any possibility of rattling relative to the rim. The threaded member 17 has been threaded home into the bore 19 by means of actuating member 42 to bring the clamping members into firm engagement with any rim. The actuating member 42 will then be in a retracted position shown in Fig. 3, being held in this position by engagement of locking bolt 45 with one side of the annular groove 47.

Rattling between loose parts is positively prevented by means of the spring 82, also assisted by the spring pressed plunger 85, and rotation of the actuating member 42 beyond a certain point is positively prevented by engagement of the plunger 85 with locking bolt 45. Since the actuating member 42 is constructed of tempered steel, it is practically impossible to secure any grip upon the actuating member when it is withdrawn into the socket 40, and even if the tumbler barrel 41 were destroyed, the actuating member 42 which controls the threaded member 17 would be retained in retracted position by engagement of plunger 85 in bore 48.

When it is desired to unlock the device, a turn of the key 46 will retract the locking bolt 45 sufficiently so that it is withdrawn from annular groove 47 and spring 82 will project the actuating member 42 to the position shown in Fig. 2. The key 46 is then preferably removed to prevent interference with wrenches or the like, and a wrench or other tool may be applied to the non-circular end 79 to rotate the actuating member 42 and withdraw threaded member 17 from the position shown in Fig. 2 to such a position that either flange 25 or 52 may be withdrawn from rim 12.

The lock may then be removed from the rim and carrier, but it will be observed that all parts of the lock are permanently fastened together so that no parts can be lost as is the case where parts of the lock are separated in the unlocked position.

When it is desired to apply the lock, the device may be placed with the flanges 25 and 52 above the upper edges of the rim 12 and a wrench or other tool applied to actuating member 42 to clamp the lock on the rim, after which it is unnecessary to again use the key, but it is sufficient to press the actuating member 42 into its socket against the tension of the spring 82, until the spring pressed locking plunger 45 springs into the annular groove 47. In some embodiments the locking bolt 45 may not be spring pressed, in which case it will be actuated into locked position by means of key 46.

It will thus be observed that I have invented a locking device including an actuating member which may be projected or retracted in such manner that the actuating member for controlling the clamping movement of the lock may be rendered non-accessible, its position being controlled by a key controlled tumbler barrel.

The component parts of my lock are always assembled together so that none of the parts may be lost when the lock has been removed from the carrier, and it will be observed that a minimum of separate operations are required for replacing the lock upon the carrier. The present construction cannot be defeated in its function by the use of ordinary tools nor by the destruction of the key actuated tumbler barrel which controls the projection or retraction of the actuating member, and no substantial strain can be brought to bear upon the locking bolt by tools applied to the actuating member.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a tire lock, the combination of a clamping member with a second clamping member having a socket therein, a threaded member rotatably carried by said second clamping member and having threaded engagement with said first mentioned clamping member, cooperating guide members carried by said clamping members for providing a slidable connection between said clamping members, an actuating member, slidably and non-rotatably connected to said threaded member for retraction into said socket, said actuating member having a pin and slot connection to said threaded member, said actuating member having a non-circular head and an annular slot, and a key actuated member for movement into said slot.

2. In a tire lock, the combination of a clamping member with a second clamping member having a socket therein, a threaded member rotatably carried by said second clamping member and having threaded engagement with said first mentioned clamping member, cooperating guide members carried by said clamping members for providing a slidable connection between said clamping members, an actuating member, slidably and non-rotatably connected to said threaded member for retraction into said socket, said actuating member having a pin and slot connection to said threaded member, said actuating member having a non-circular head and an annular slot, a key actuated member for movement into said slot, and a spring actuated plunger carried by said actuating member to engage said key actuated member.

3. In a spare tire lock, the combination of a pair of gripping members adapted to be secured on a tire rim embracing a carrier part, said gripping members being movably mounted with respect to each other to clamp the rim, a threaded member threaded into one of said gripping members and having its head rotatably mounted in a recess in the other gripping member, a transverse pin carried by said head in said recess, and an actuating member adapted to be received in said recess, having a socket for said head and a pair of longitudinally extending slots for receiving said pin, said actuating member being adapted to extend from said gripping member or to be retracted into said gripping member.

4. In a spare tire lock, the combination of a pair of gripping members adapted to be secured on a tire rim embracing a carrier part, said gripping members being movably mounted with respect to each other to clamp the rim, a threaded member threaded into one of said gripping members and having its head rotatably mounted in a recess in the other gripping member, a transverse pin carried by said head in said recess, an actuating member adapted to be received in said recess, having a socket for said head and a pair of longitudinally extending slots for receiving said pin, said actuating member being adapted to extend from said gripping member or to be retracted into said gripping member, said slots being formed with confining shoulders to retain said pin in said slots, and a spring confined in said socket between said head and said actuating member.

5. In a spare tire lock, the combination of a pair of gripping members adapted to be secured on a tire rim embracing a carrier part, said gripping members being movably mounted with respect to each other to clamp the rim, a threaded member threaded into one of said gripping members and having its head rotatably mounted in a recess in the other gripping member, a transverse pin carried by said head in said recess, an actuating member adapted to be received in said recess, having a socket for said head and a pair of longitudinally extending slots for receiving said pin, said actuating member being adapted to extend from said gripping member or to be retracted into said gripping member, said slots being formed with confining shoulders to retain said pin in said slots, a spring confined in said socket between said head and said actuating member, and a tumbler barrel carried by said other gripping member, said actuating member having an annular slot, and said barrel having a locking bolt for projection into said slot.

6. In a spare tire lock, the combination of a pair of gripping members adapted to be secured on a tire rim embracing a carrier part, said gripping members being movably mounted with respect to each other to clamp the rim, a threaded member threaded into one of said gripping members and having its head rotatably mounted in a recess in the other gripping member, a transverse pin carried by said head in said recess, an actuating member adapted to be received in said recess, having a socket for said head and a pair of longitudinally extending slots for receiving said pin, said actuating member being adapted to extend from said gripping member or to be retracted into said gripping member, said slots being formed with confining shoulders to retain said pin in said slots, a spring confined in said socket between said head and said actuating member, a tumbler barrel carried by said other gripping member, said actuating member having an annular slot, and said barrel having a locking bolt for projection into said slot, and a spring pressed plunger carried by said actuating member and located in said annular slot.

In witness whereof, I hereunto subscribe my name this 31st day of January, 1929.

EDGAR G. PETERSEN.